(12) United States Patent
Lu (10) Patent No.: US 12,179,671 B2
(45) Date of Patent: Dec. 31, 2024

(54) VEHICLE AND ROOF CONSTRUCTION INCLUDING A DISPLAY DEVICE FOR USE THEREIN

(71) Applicant: Inalfa Roof Systems Group B.V., Oostrum (NL)

(72) Inventor: Minjie Lu, Shanghai (CN)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 64 days.

(21) Appl. No.: 17/539,955

(22) Filed: Dec. 1, 2021

(65) Prior Publication Data
US 2022/0176889 A1 Jun. 9, 2022

(30) Foreign Application Priority Data

Dec. 3, 2020 (CN) .......................... 202011416271.7

(51) Int. Cl.
*B60R 11/02* (2006.01)
*B60R 13/02* (2006.01)
(Continued)

(52) U.S. Cl.
CPC ...... *B60R 11/0229* (2013.01); *B60R 13/0212* (2013.01); *B60J 7/0007* (2013.01);
(Continued)

(58) Field of Classification Search
CPC ................. B60R 11/00; B60R 11/0229; B60R 2011/0001; B60R 2011/0028;
(Continued)

(56) References Cited

U.S. PATENT DOCUMENTS

| 11,673,513 B2 | 6/2023 | Lojko et al. |
| 2011/0042996 A1* | 2/2011 | Demma ................. B60J 3/0243 296/98 |

(Continued)

FOREIGN PATENT DOCUMENTS

| CN | 108773329 A | 11/2018 |
| EP | 2873563 A1 | 5/2015 |

(Continued)

OTHER PUBLICATIONS

Koelbl et al., "Vehicle Roof Comprising a Shade Arrangement, and Canopy Module for a Vehicle Roof", Published: Jul. 28, 2005, Published: German Patent Office, Edition: WO2005068236A2 (Year: 2005).*

(Continued)

*Primary Examiner* — Jason S Daniels
(74) *Attorney, Agent, or Firm* — Steven M. Koehler; Westman, Champlin & Koehler, P.A.

(57) ABSTRACT

A vehicle having a roof construction, comprises a panel fitted in an opening in the fixed roof of the vehicle, and a headliner on the interior side of the fixed roof for hiding the fixed roof and stationary frame from view. At least one display device is capable of showing images from its display screen to occupants in the vehicle. A drive system is provided for moving the display screen at least into a storage position, and into an operational position in which the display screen is visible for occupants in the vehicle. The display screen is flexible and is moved, in its storage position, at least substantially into a cavity above the headliner and is thus substantially hidden from view.

20 Claims, 9 Drawing Sheets

(51) Int. Cl.
  *B60J 7/00* (2006.01)
  *B60R 1/00* (2022.01)
  *B60R 11/00* (2006.01)
(52) U.S. Cl.
  CPC .............. *B60J 7/0015* (2013.01); *B60R 1/00* (2013.01); *B60R 11/00* (2013.01); *B60R 2011/0028* (2013.01); *B60R 2011/008* (2013.01); *B60R 2011/0082* (2013.01); *B60R 13/0231* (2013.01)
(58) Field of Classification Search
  CPC ....... B60R 2011/0003; B60R 2011/008; B60R 2011/0082; B60R 2011/00282; B60R 1/00; B60R 13/0212; B60R 13/0231; B60J 7/0007; B60J 7/0015; B60J 7/043; G09G 2300/04; G06F 1/1601; G06F 1/1607; G06F 1/1609; G06F 1/1611; G06F 1/1637; G09F 21/049
  USPC .................... 296/37.7, 214, 216.01; 348/837
  See application file for complete search history.

(56) References Cited

U.S. PATENT DOCUMENTS

| | | | | |
|---|---|---|---|---|
| 2014/0097636 | A1* | 4/2014 | Snider | B60J 3/02 296/97.8 |
| 2014/0117725 | A1* | 5/2014 | Rooijakkers | B60J 7/0573 296/223 |
| 2015/0138043 | A1 | 5/2015 | Rawlinson et al. | |
| 2016/0187929 | A1* | 6/2016 | Kim | G06F 1/1643 345/184 |
| 2017/0158034 | A1 | 6/2017 | Nellen et al. | |
| 2017/0232908 | A1* | 8/2017 | Jung | B60K 37/04 296/37.7 |
| 2018/0130974 | A1* | 5/2018 | Koo | G02F 1/133308 |
| 2019/0092170 | A1* | 3/2019 | Gassman | B60R 11/0229 |
| 2019/0202349 | A1* | 7/2019 | Winton | B60J 7/0007 |
| 2020/0062195 | A1* | 2/2020 | Forgette | B60R 13/0206 |
| 2020/0070736 | A1* | 3/2020 | Kim | B60K 35/00 |
| 2021/0061100 | A1* | 3/2021 | Zhou | B60K 35/00 |
| 2021/0197731 | A1 | 7/2021 | Vervoort et al. | |

FOREIGN PATENT DOCUMENTS

| | | | | |
|---|---|---|---|---|
| EP | 3845420 | A1 | 7/2021 | |
| JP | 2005349977 | A | 12/2005 | |
| KR | 20190140806 | A | 12/2019 | |
| WO | WO-2005068236 | A2 * | 7/2005 | ............ B60J 7/0015 |
| WO | 2020020763 | A1 | 1/2020 | |

OTHER PUBLICATIONS

Search Report in corresponding European patent application No. 21211560.4 dated Apr. 11, 2022.

* cited by examiner

VEHICLE AND ROOF CONSTRUCTION INCLUDING A DISPLAY DEVICE FOR USE THEREIN

BACKGROUND

The discussion below is merely provided for general background information and is not intended to be used as an aid in determining the scope of the claimed subject matter.

Display devices in vehicles are known from the prior art for instance in which display devices are attached to the interior side of the roof of a vehicle and which displays can easily be pivoted from a storage position into an operational position in which the display screen is readable to the occupants of the vehicle.

In case a vehicle is equipped with a roof construction having a fixed semi-transparent panel or a roof construction having a semi-transparent panel which is openable, the use of a display devices becomes more complicated, especially when the roof construction is equipped with more than one semi-transparent panel and thus occupies a large area of the vehicle roof. In such case the use of display devices attached to the roof is difficult because when the display devices are in the storage position they would obstruct the view through the semi-transparent panels and the amount of light that may reach the interior. Also such display devices in their storage positions would influence other functionalities of the roof construction, for instance interfere with or completely cover the semi-transparent panels from the interior side, or obstruct ventilation in case of an opened panel.

From a customer point of view there is a tendency to enlarge the size of the display devices such that the occupants can view larger images. Such larger display devices are not suitable to be simply rotated downwards from a stored position into an operational position, because the rotating display device will move close towards or even may be within the facial region of the occupant. To avoid this, the display device may be moved from a stored position into an operational position in a different way. In that case, the display device is positioned overhead in a horizontal plane with the display screen facing downwards, the display device may be moved horizontally to the front and at the same time may be rotated downwards whereby the front part of the display device rotates downward first towards the operational position. In this way it is avoided that the display device protrudes into the facial region of the occupant. Nevertheless also with this improved movement of the display device still the display device interferes with the functions of the roof construction. Next to this, when the display screen is facing downwards when the display screen is in its stored position, there may be a risk of damaging the display screen for instance by objects being moved in the interior. And when the display device is visible in the interior of the vehicle in their stored position, there may be an incentive for theft of the display device.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A vehicle having a roof construction, comprises a panel fitted in an opening in the fixed roof of the vehicle, and a headliner on the interior side of the fixed roof for hiding the fixed roof and stationary frame from view. At least one display device is capable of showing images from its display screen to occupants in the vehicle. A drive system is provided for moving the display screen at least into a storage position, and into an operational position in which the display screen is visible for occupants in the vehicle. The display screen is flexible and is moved, in its storage position, at least substantially into a cavity above the headliner and is thus substantially hidden from view.

Due to the position of the display device above the headliner when in its storage position, it is protected against damage which may be caused by moving objects in the interior space. As the headliner also hides the display device from view, it does not interfere, for example in allowing light entering through the open or transparent panel when in its storage position. The flexibility of the screen allows for non-interfering movements of the display screen into and out of the operational position.

In one embodiment, the flexible display screen is connected to at least a first and second support element, the first support element being movable along substantially horizontal guides to move the display screen out of and into the cavity, the second support element being also movable along said guides and being movable downwardly and upwardly to move the screen into and from its lower operational position, a winding roller being provided to allow the second support element to form the display screen by unwinding the display screen.

Consequently, the display screen is not only moved out of the way into its storage position, but the size is also minimized by winding it onto a winding roller. Unwinding the display screen can be done in a way not disturbing the occupants.

At least one of said first and second support elements could include the winding roller to unwind and wind said flexible display screen.

Preferably, the display device could include a third supporting element also movable along the substantially horizontal guides, and a support beam carrying the second support element through a vertical moving mechanism, preferably a vertical linkage, forming at least a part of the drive system, wherein the display screen preferably extends both between the first and second support element and between the second and third support element to show images in two opposite directions.

In one embodiment, the first to third support element and the support beam are movable along the substantially horizontal guides as a unit to move the display screen from and to the storage position within the cavity, while the first and third support element are connected to the vertical linkage through a horizontal linkage and are configured to move with respect to each other and with respect to the support beam to activate the horizontal linkage and thereby the vertical linkage to move the second support element down and up.

The drive system may comprise at least one drive motor, capable of driving at least one pair of flexible drive cables extending along the guides, said drive cables being connected to at least one of the support elements.

The at least one panel may be at least semi-transparent and can be covered from the interior side by a sunscreen to block light coming through the panel, the sunscreen preferably being in the form of a rollo screen which can be rolled-on or -off from a winding roller which is positioned in the cavity for the at least one display screen. The display screen is preferably provided below the sunscreen, so that the sunscreen may be closed when the display device is in its operational position and therefore direct sunlight cannot reach the display screen.

In one embodiment, the drive cables are operatively connected to both the sunscreen and the display device, and wherein the drive system of the display screen is provided with coupling/uncoupling members to either couple to or uncouple from the drive cables or the guides.

In one particular embodiment, the display screen is formed by the sunscreen which is in the form of a rollo screen. In this way the sunscreen and the display screen are integrated.

The invention also includes a roof construction for use in the vehicle as described above.

BRIEF DESCRIPTION OF DRAWINGS

Aspects of the invention will be further explained with reference to the drawings showing exemplary embodiments of the roof construction and vehicle according to the invention.

DETAILED DESCRIPTION OF THE ILLUSTRATIVE EMBODIMENTS

Figure 1:
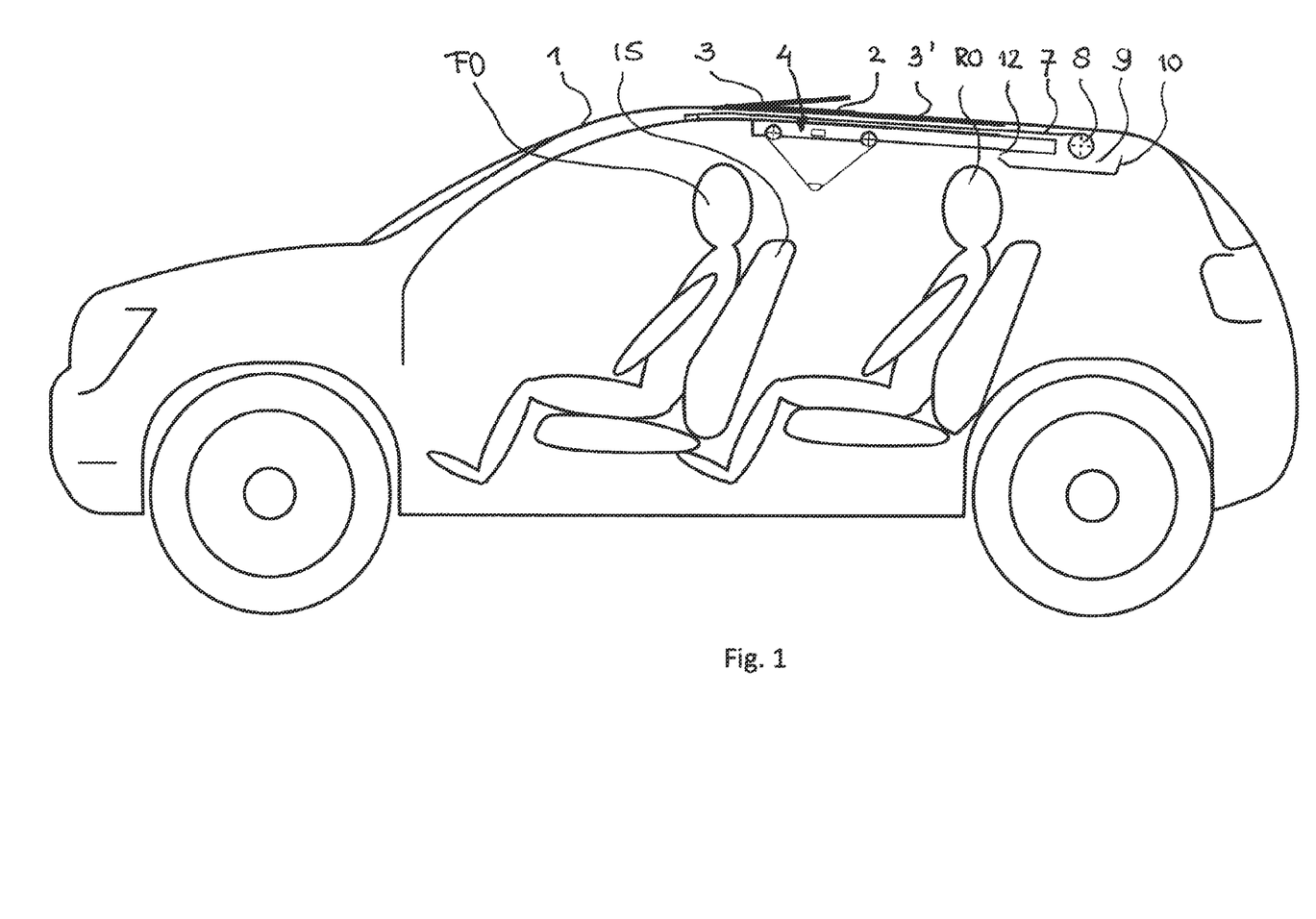
FIG. 1 is a very schematic longitudinal sectional view of a vehicle with a roof construction.

FIG. 1 illustrates a vehicle, in this case an SUV type passenger car, having a fixed roof 1, comprising an opening 2 formed therein and a roof construction attached to it. The roof construction of FIG. 1 includes a, preferably, at least semi-transparent panel 3. FIG. 1 shows a roof construction equipped with either one or more movable panels 3 or with a combination of a fixed panel 3' in the rear of the roof opening 2 and a movable panel 3 in the front thereof. The roof construction may however also comprise one (large) fixed panel.

Further a display device 4 is illustrated which is shown in an operational position. The operational position of the display device 4 is the position in which the rear occupant(s) RO has the optimum line of view on a display screen 5 of the display device 4. In FIG. 1 not only a display screen 5 is shown for the rear occupant(s) RO, but also a display screen 6 for front occupant(s) FO if they are turned 180 degrees in order to look backwards. This is particularly useful in full self-driving vehicles wherein there is no driver necessary for driving the car.

The display screens 5, 6 can be a flexible OLED-type screen or other flexible screen that emits images itself, but it can also be a passive display screen onto which images can be projected by a separate projector. This projector or these projectors can be arranged in a stationary or movable manner at a distance from the display screen 5, 6 when in its operational position.

Figure 2A:
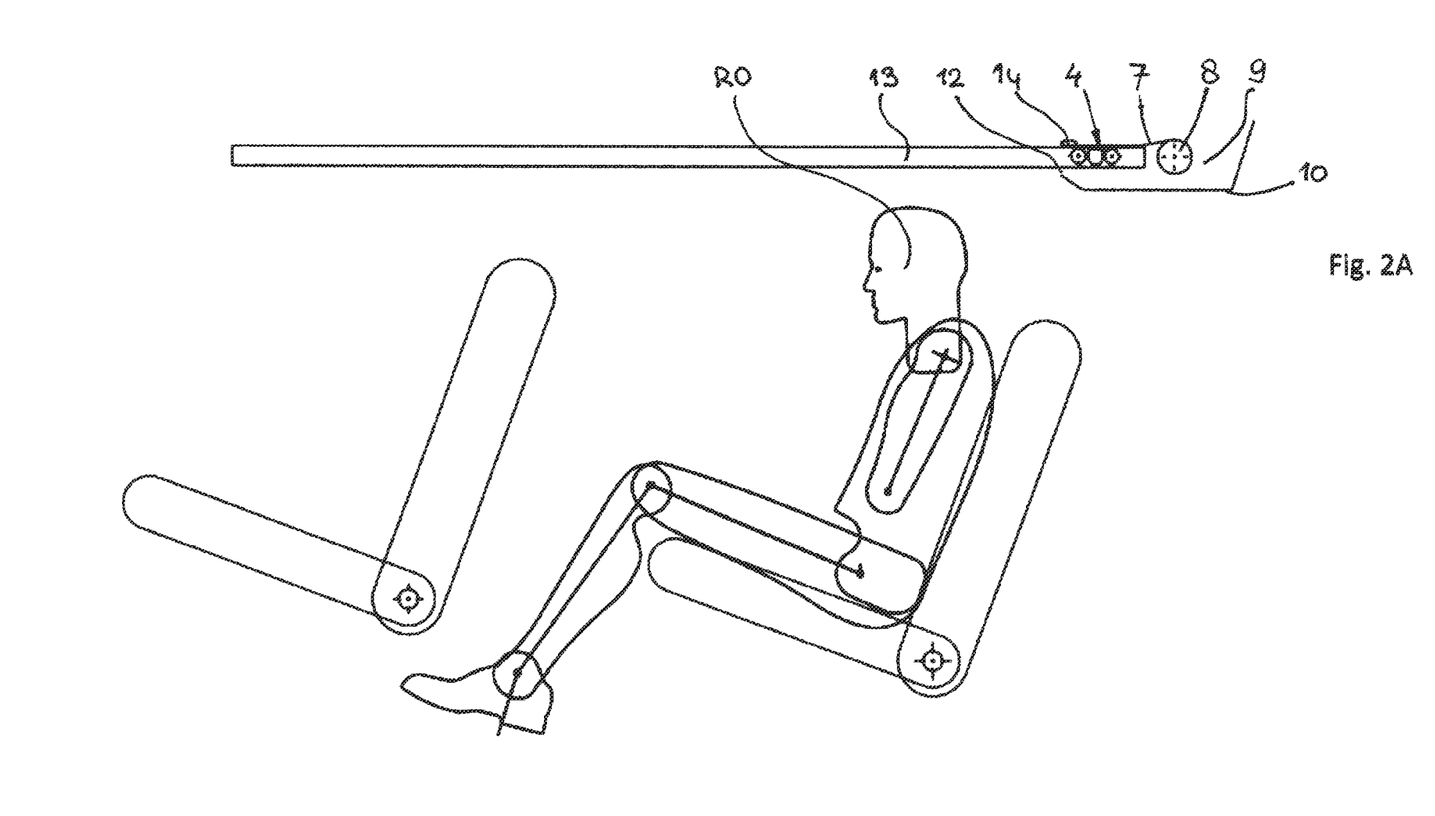
FIG. 2A—2C show a part of the interior of the vehicle of FIG. 1 on a slightly larger scale and with the display device in three different positions.

FIG. 2A shows a view of the interior of the vehicle with a part of the roof construction in the form of a sunscreen 7, here a flexible sunscreen (rollo) which can be wound on and off a winding roller 8. This winding roller 8 is positioned within a cavity 9 above a headliner 10 of the vehicle, covering fixed roof 1 and a frame 11 (see FIG. 3A) of the roof construction from below and hiding it from view. It is further shown in FIG. 2 that the display device 4, at least (parts of) display screen 5, 6, is also positioned at least substantially within cavity 9 when in its storage position where it is also hidden from view. An opening 12 at the front of cavity 9 allows display device 4 and sunscreen 7 to enter and exit cavity 9. Two elongated guides 13 also extend through opening 12 between cavity 9 and in this case a position in front of roof opening 2. The guides 13 extend below the side edges of roof opening 2 and are not only used to guide substantially horizontal movements of parts of display device 4, but also for guiding parts of an operating mechanism (not shown) for movable panel 3 and for guiding sunscreen 7 and in particular an operating beam 14 thereof, attached to the free forward end of sunscreen 7. Normally, guides 13 will be covered from below by headliner 10.

Figure 2B:
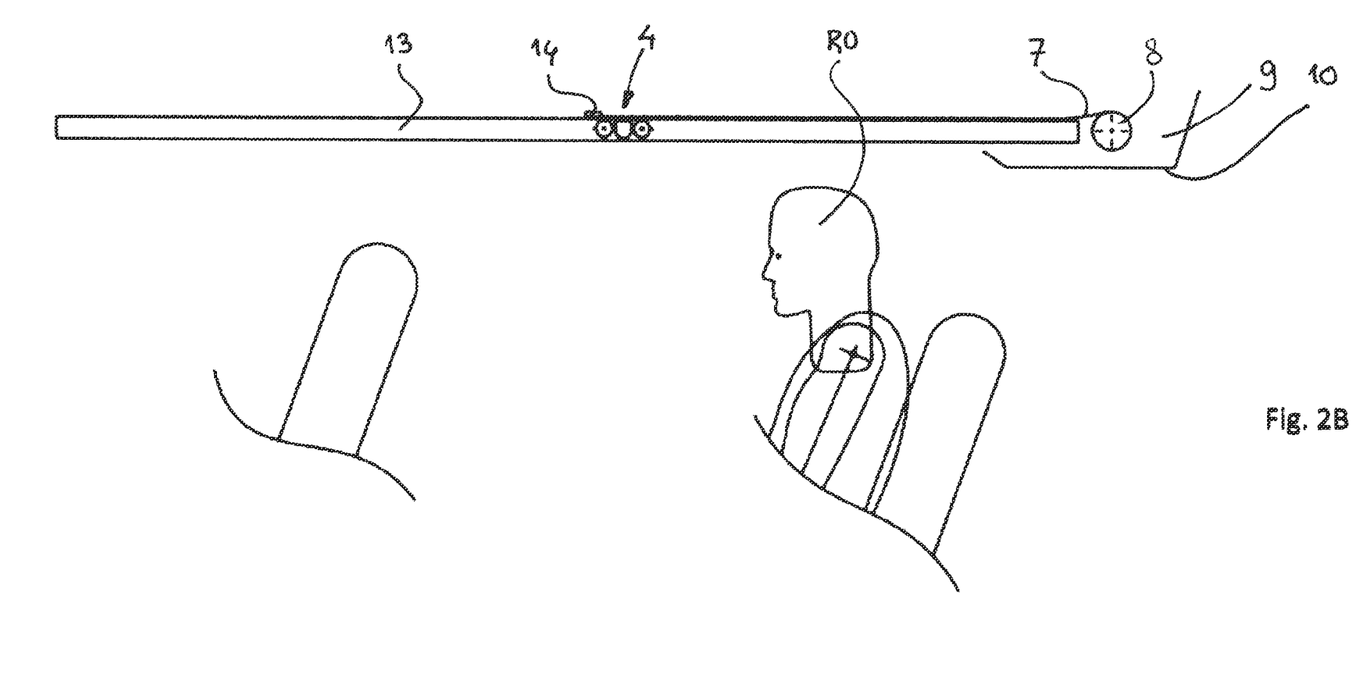

FIG. 2B shows how display device 4 is moved from its storage position within cavity 9 in forward direction along guides 13 to a position just behind front seats 15 at a proper viewing distance of rear occupants RO. It is also illustrated that display device 4 is moved to this position simultaneously with operating beam 14 so that sunscreen 7 is unwound.

Figure 2C:
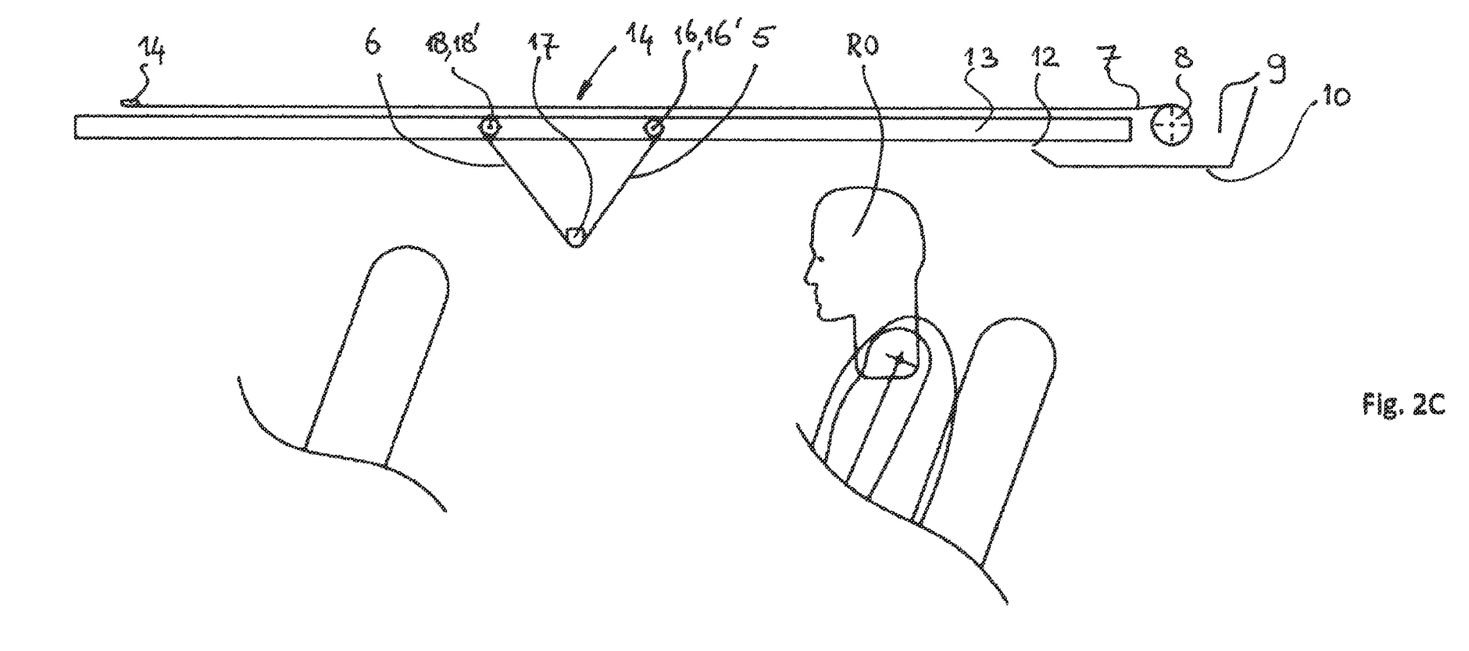

In FIGS. 2A-2C it can be seen that display device 4 includes a rear support element 16 carrying a rear winding roller 16', a second support element 17 in the form of a vertically movable central guide beam determining a lower edge of display screen 5, 6 and a third support element 18 including a front winding roller 18'. Between the positions of FIGS. 2A and 2B these support elements 16-18 move as a unit. In the position of FIG. 2B, rear winding roller 16' is locked with respect to guides 13 and unlocked from front winding roller 18' and central guide beam 17. When operating beam 14 is moved further forwards it still takes along front winding roller 18', while rear winding roller 16' is stationary. This relative movement between support elements 16 and 18 is used to move central guide beam 17 downwardly thereby unwinding flexible display screens 5, 6 from winding rollers 16', 18' so as to be moved into their operational position. FIG. 2C illustrates that when front winding roller 18' and central guide beam 17 have reached their end position, operating beam 14 can be disconnected from front winding roller 18' so as to be moved to the front side of opening 2 and thereby cover opening 2 completely to prevent sunlight to enter the interior of the vehicle through roof opening 2 and through panels 3, 3'.

Figure 3A:
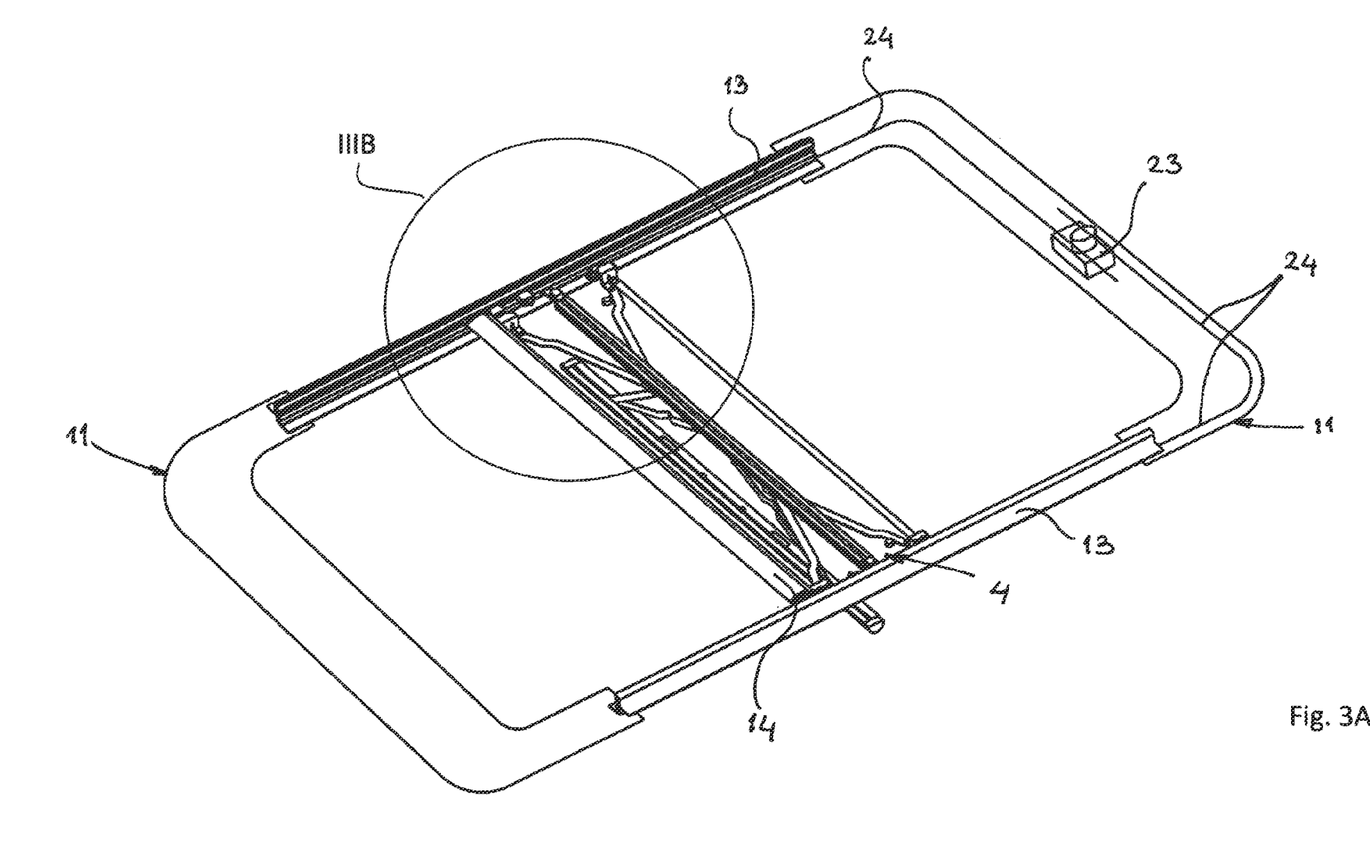
FIG. 3A is a schematic perspective view of the roof construction with the display device in its operational position
Figure 3B:
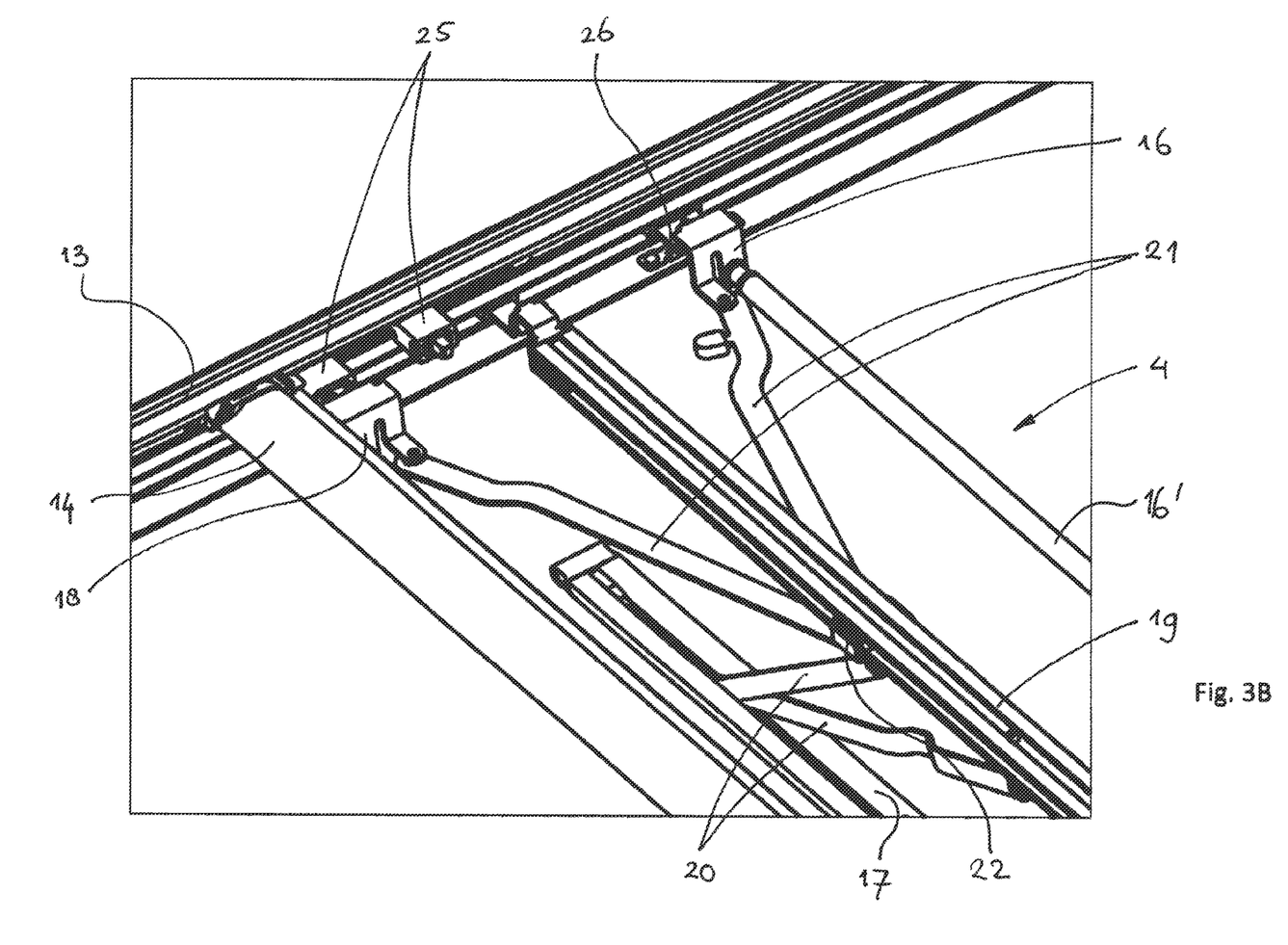
FIG. 3B shows detail IIIB in FIG. 3A on a larger scale.

FIGS. 3A and 3B show an example of a drive system to use the relative movement of support elements 16 and 18 to move guide beam 17. First there is a support beam 19 which is slidably guided with its ends in guides 13. Guide beam 17 is movably supported by support beam 19 through a vertical linkage 20 (only one of the linkages is shown in FIG. 3B, the same, but in mirror image, is provided near the opposite end of support beam 19, see FIG. 3A). A horizontal linkage 21 (also present on the other side) is connected to the first and third support elements 17, 19 and to vertical linkage 21, such that when the legs of horizontal linkage 21 are moved from parallel to a triangular shape (with guide 13 as base), the parallel legs of vertical linkage 20 are also moved from a parallel (horizontal, transverse) position to a triangular shape (with support beam 19 as base), such that guide beam 17 is moved downwardly.

As is shown in FIG. 3B the legs of horizontal linkage 21 are pivotally connected to a slider 22 on support beam 19 and at the same time one of the legs of vertical linkage 20 is also pivotally connected to slider 22. As a result, the movement of horizontal linkage 21 is transmitted into a vertical movement of vertical linkage 20 and thereby in a vertical movement of guide beam 17 in order to deploy display screens 5, 6. A movement of display screens 5, 6 to the storage position again is done in reverse order.

The support elements 16, 18 for winding rollers 16', 18' and support beam 19 will be provided with slide shoes at their ends engaging sliding grooves in guides 13 in order to enable sliding movements with respect to these guides 13, just like operating beam 14. When operating beam 14 is electrically operated there will be mounted an electric motor 23 on frame 11 and push-and-pull cables 24 connecting the electric motor 23 through guides 13 to the ends of operating beam 14. This type of drive system is well known in the art. Also mechanisms to couple and uncouple or lock and unlock parts to a drive cable or to a guide 13 are known as well. Parts 25 and 26 of such locking/unlocking system are shown in FIG. 3B.

Figure 4A:
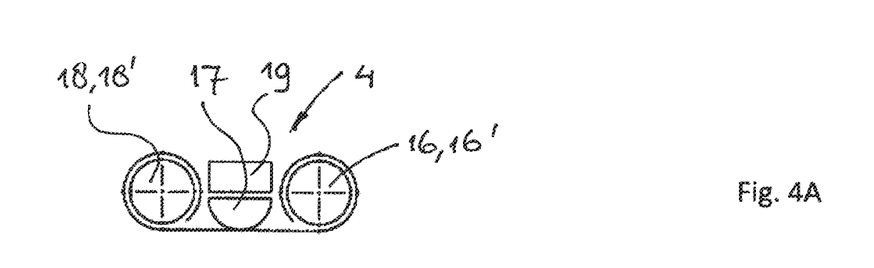
FIGS. 4A-4C show schematic side views of the display device illustrating 3 different positions thereof.
Figure 4B:
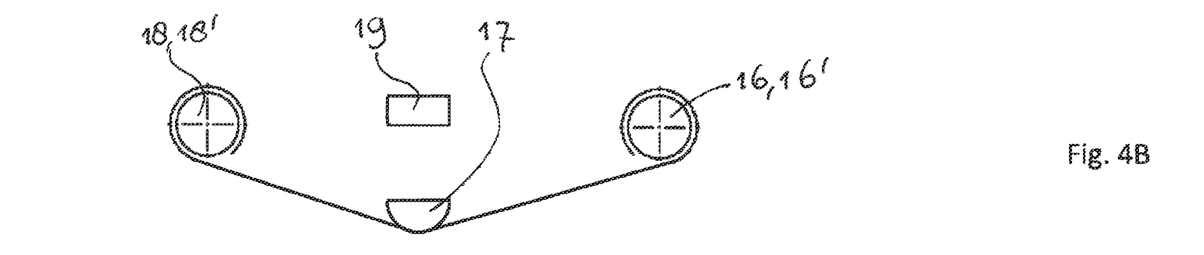
Figure 4C:
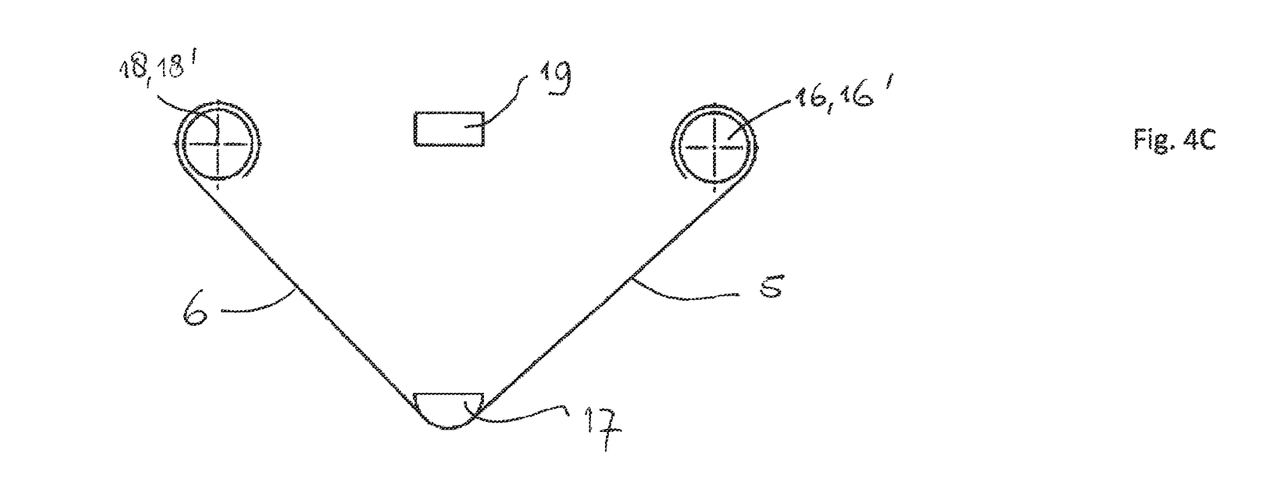

FIGS. 4A-4C again show how display screens 5, 6 are unwound by first locking rear winding roller 16' (FIG. 4A) and then continuing the sliding movement of front winding roller 18' (FIG. 4B) and using this relative horizontal movement to convert it into a vertical movement of guide beam 17 until display screens 5, 6 are in their operational position (FIG. 4C).

Figures 5, 6A, 6B, 6C, 6D:
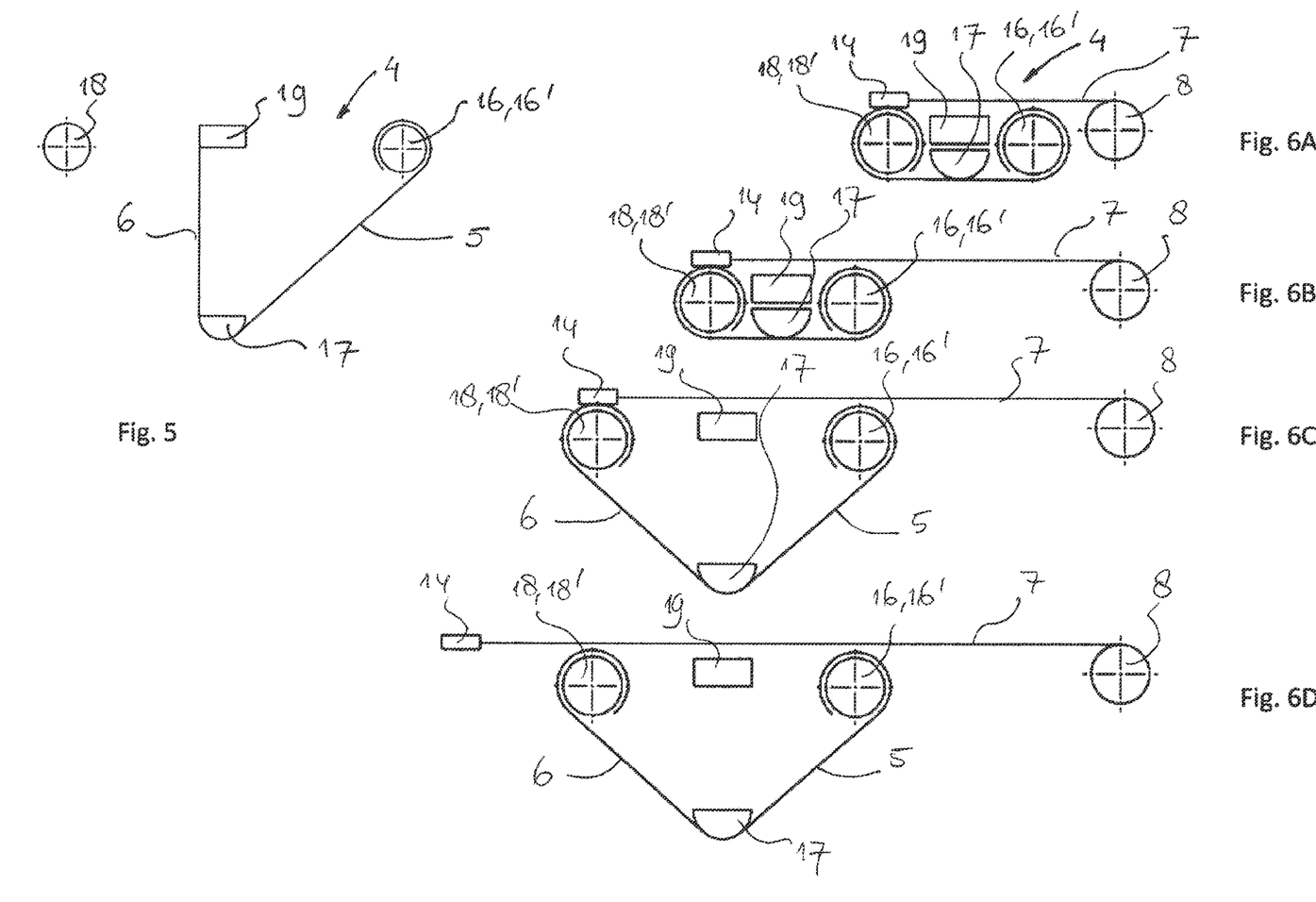
FIG. 5 is a view corresponding to that of FIG. 4C but showing another embodiment of the display device.
FIG. 6A—6D are views corresponding to that of FIGS. 4A-4C, but showing a different embodiment and with one additional position of the display device.
Figure 7A:
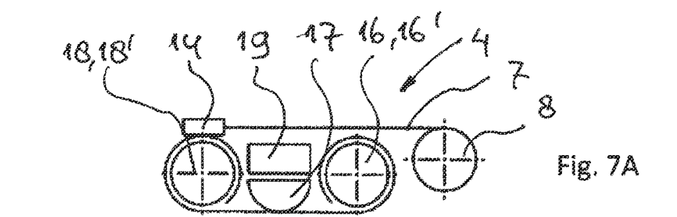
FIG. 7A—7D are views corresponding to that of FIG. 6A-6D but showing still another embodiment.
Figures 7B, 7C, 7D:
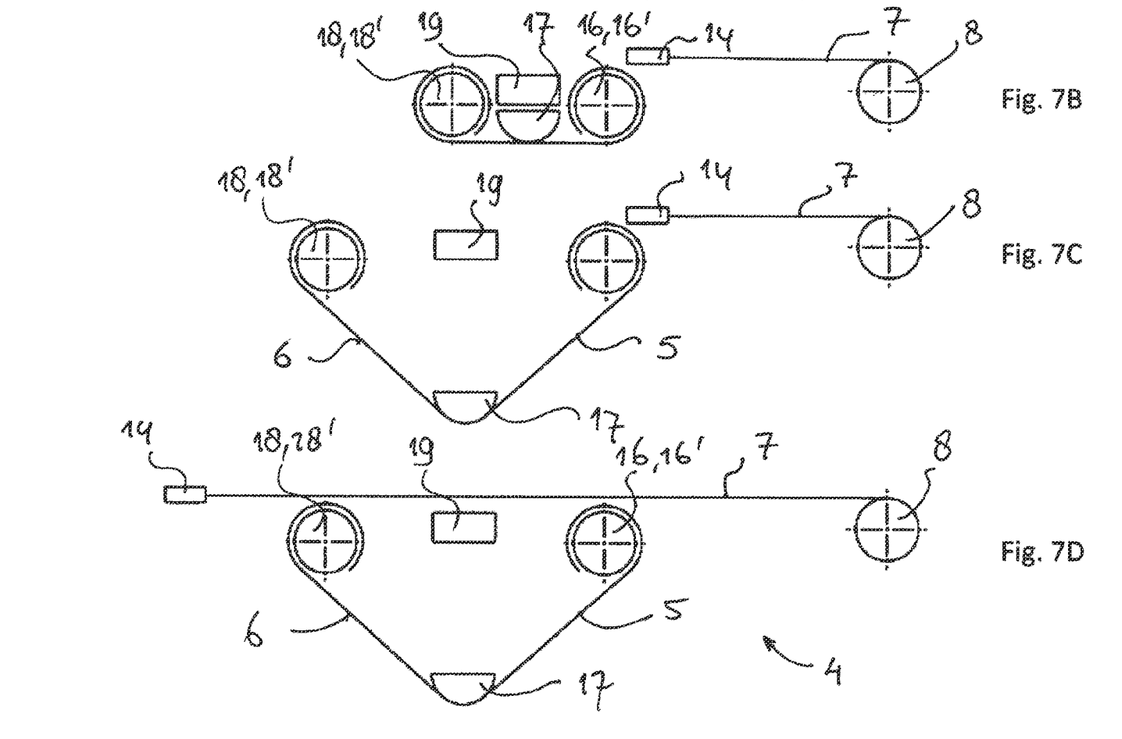

FIG. 5 shows an embodiment in which there is only display screen 5 wound on rear winding roller 16'. Front winding roller 18' is only used to create the relative horizontal movement, but this can also be accomplished by support element 18 without winding roller. Display screen 5 is fixedly connected at its end remote from rear winding roller 16' to support beam 19. In another embodiment it would also be conceivable to fix display screen 5 to guide beam 17. In the embodiment according to FIG. 5 the vertical screen 6 could still be used to display images to front occupants FO. Front winding roller 18' and its support element 18 can be left out completely if a linkage between first support element 16 and support beam 19 is able to activate vertical linkage 20. Operating beam 14 will then be coupled to support beam 19.

FIG. 6A—6D again show how operating beam 14 of sunscreen 7 controls movements of display device 4, so that sunscreen 7 is always closed/unwound at least partly if the display screens 5, 6 are moved to their operational position. This is not illogical as display screens 5, 6 will show their images in best quality if direct sunlight is blocked by sunscreen 7. If one wishes to only close sunscreen 7 display device 4 will always be moved to its operational position unless operating beam 14 could be uncoupled from front winding roller 18' at the start of its forward movement, such that display device 4 will remain stationary in its storage position within cavity 9.

In the embodiment of FIGS. 7A-7D display device 4 and sunscreen 7 have their own (hand or electric) drive, so that the movements of display device 4 and (operating beam 14 of) sunscreen 7 are totally independent of each other.

It is clear from the foregoing description that the invention provides a vehicle with a display screen that can be integrated in the roof of the vehicle, has an advantageous deploying movement and is hidden from view when not in use.

The invention is not limited to the embodiments shown in the drawings and described hereinbefore which can be varied in different manners within the scope of the appended claims. For example, it would be possible that the sunscreen and the display screen are integrated, such that a part of the sunscreen could be moved downwardly into the shape as shown in the drawings to form the display screen. For example, at the operational position of the display screen there could be arranged two parallel spaced support rollers which come to lie below the closed sunscreen, while a vertically movable guide beam is positioned between the support rollers albeit above the sunscreen, such that when it is moved down, it creates a downward V-shape in the sunscreen. Both legs of the V-shape could be used as display screens. Furthermore, it would be possible that not the first and/or third support elements include winding roller(s) but the second support element. The embodiments shown in the drawings show a display screen extending from one guide to the other thus being substantially as wide as the panel. In case there is a central longitudinal beam along the roof of the vehicle interior, this central beam could carry further guides, such that two separate displays screens could be formed, one on each side of the central beam.

What is claimed is:

1. A vehicle having a roof construction in a fixed roof, comprising:
    at least one panel fitted in an opening in the fixed roof of the vehicle,
    a stationary frame to which the at least one panel is connected,
    a headliner on an interior side of the fixed roof for hiding the fixed roof and the stationary frame from view,
    at least one display device having a display screen, the at least one display device configured to show images from the display screen to occupants in the vehicle,
    a drive system configured to move the display screen at least into a storage position, and into an operational position in which the display screen is visible for occupants in the vehicle,
    wherein the display screen is flexible and is moved, in its storage position, at least substantially into a cavity above the headliner and is thus substantially hidden from view, and
    wherein the flexible display screen is connected to at least a first and second support element, the first support element being coupled to and movable along substantially horizontal guides to move the display screen out of and into the cavity, the second support element being also coupled to and movable along said guides and the second support element being coupled to the drive system independently of the display screen and movable downwardly and upwardly by the drive system in order to move the display screen into and from the operational position, a winding roller being provided to allow the second support element to form the display screen by unwinding it.

2. The vehicle according to claim 1, wherein at least one of said first and second support elements include the winding roller to unwind and wind said flexible display screen.

3. The vehicle according to claim 2, wherein the first support element includes the winding roller.

4. The vehicle according to claim 2, wherein the second support element includes the winding roller.

5. The vehicle according to claim 1, comprising a third supporting element also movable along the substantially horizontal guides, and a support beam carrying the second support element through a vertical moving mechanism.

6. The vehicle according to claim 5 wherein the vertical moving mechanism is a vertical linkage forming at least a part of the drive system.

7. The vehicle according to claim 6 wherein the display screen extends both between the first and second support element and between the second and third support element to show images in two opposite directions.

8. The vehicle according to claim 5, wherein the vertical moving mechanism is a vertical linkage forming at least a part of the drive system, and wherein the first, second and third support elements and the support beam are movable along the substantially horizontal guides as a unit to move the display screen from and to the storage position within the cavity, while the first and third support elements are connected to the vertical linkage through a horizontal linkage and are configured to move with respect to each other and with respect to the support beam to activate the horizontal linkage and thereby the vertical linkage to move the second support element down and up.

9. The vehicle according to claim 1, wherein the drive system comprises at least one drive motor configured to drive at least one pair of flexible drive cables extending along the guides, said at least one pair of flexible drive cables being connected to at least one of the support elements.

10. The vehicle according to claim 1, wherein the at least one panel is at least semi-transparent and is coverable from the interior side by a sunscreen to block light coming through the at least one panel.

11. The vehicle according to claim 10 wherein the sunscreen is in the form of a rollo screen which rolls on and off a winding shaft roller positioned in the cavity for the display screen.

12. The vehicle according to claim 10, wherein the drive system comprises at least one drive motor configured to drive at least one pair of flexible drive cables extending along the guides, said at least one pair of flexible drive cables being connected to at least one of the support elements, and wherein the at least one pair of flexible drive cables is operatively connected to both the sunscreen and the display screen, and wherein the drive system of the display screen is provided with coupling/uncoupling members to either couple to or uncouple from the drive cables or the guides.

13. The vehicle according to claim 10, wherein the display screen is provided below the sunscreen.

14. A vehicle having a roof construction in a fixed roof, comprising:
at least one panel fitted in an opening in the fixed roof of the vehicle,
a stationary frame to which the at least one panel is connected,
a headliner on an interior side of the fixed roof for hiding the fixed roof and the stationary frame from view,
at least one display device having a display screen, the at least one display device configured to show images from the display screen to occupants in the vehicle,
a drive system configured to move the display screen at least into a storage position, and configured to move the display screen downwardly into an operational position in which the display screen is visible for occupants in the vehicle,
wherein the display screen is flexible and is moved, in its storage position, at least substantially into a cavity above the headliner and is thus substantially hidden from view,
wherein the at least one panel is at least semi-transparent and is coverable from the interior side by a sunscreen to block light coming through the at least one panel, and
wherein the display screen is formed by the sunscreen which is in the form of a rollo screen.

15. A roof construction for a vehicle, comprising:
at least one semi-transparent panel fitted in an opening in a fixed roof of the vehicle,
a stationary frame to which the at least one semi-transparent panel is connected,
at least one display device having a display screen, the at least one display device configured to show images from the display screen to occupants in the vehicle,
a drive system configured to move the display device at least into a substantially horizontal storage position, and into an operational position in which the display screen is visible for occupants in an interior space of the vehicle,
wherein the stationary frame comprises longitudinal guides for the display screen which is flexible, the drive system being configured to move the display screen downwardly away from the longitudinal guides into the operational position, and the drive system being configured to move the display device into its storage position at ends of the guides, such that when the display device is mounted into the roof construction, the display device is covered in its storage position from below by a headliner of the vehicle, wherein the headliner surrounds a circumventing edge of the at least one semi-transparent panel and leaves an opening leading to a cavity to enable the display screen to enter and exit the cavity,
wherein the at least one semi-transparent panel is coverable from an interior side by a sunscreen to block light coming through the at least one semi-transparent panel, and
wherein the display screen is formed by the sunscreen which is in the form of a rollo screen.

16. A vehicle having a roof construction in a fixed roof, comprising:
at least one panel fitted in an opening in the fixed roof of the vehicle,
a stationary frame to which the at least one panel is connected,
a headliner on an interior side of the fixed roof configured to hide the fixed roof and stationary frame from view,
at least one display device having a display screen, the at least one display device configured to show images from the display screen to occupants in the vehicle, and
a drive system configured to move the display screen at least into a storage position and into an operational position in which the display screen is visible for one or more occupants in an interior space of the vehicle,
wherein the display screen is flexible and is connected to at least a first and second support element, the first support element being coupled to and movable along longitudinal guides to move the display screen out of and into the storage position, the second support element being also coupled to and movable along said guides and the second support element being coupled to the drive system independently of the display screen and furthermore movable downwardly and upwardly by the drive system in order to move the display screen into and from the operational position, a winding roller being provided to allow the second support element to form the display screen by unwinding the display screen from the winding roller.

17. The vehicle according to claim 14, wherein the rollo screen which rolls on and off a winding shaft roller positioned in the cavity for the display screen.

18. The vehicle according to claim 14, wherein the display screen is provided below the sunscreen.

19. The vehicle according to claim 15, wherein the rollo screen which rolls on and off a winding shaft roller positioned in the cavity for the display screen.

20. The vehicle according to claim 15, wherein the display screen is provided below the sunscreen.

* * * * *